C. W. McNAUGHTON & R. M. McDONALD.
ELECTRIC TRAP.
APPLICATION FILED JUNE 13, 1913.
1,117,683.
Patented Nov. 17, 1914.
2 SHEETS—SHEET 1.
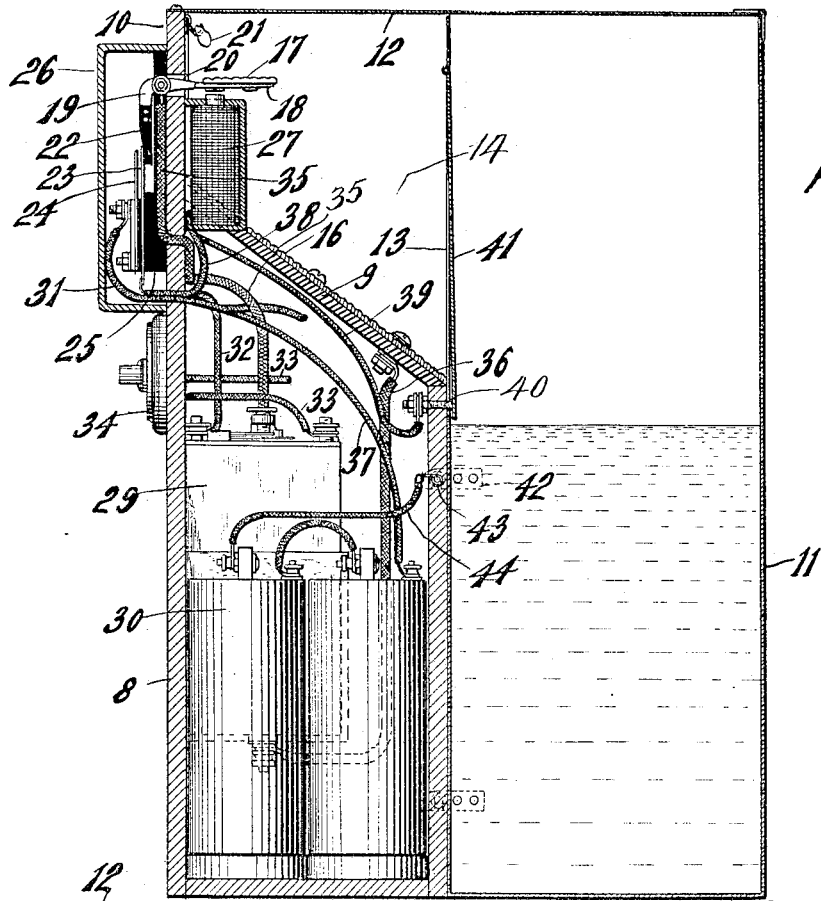
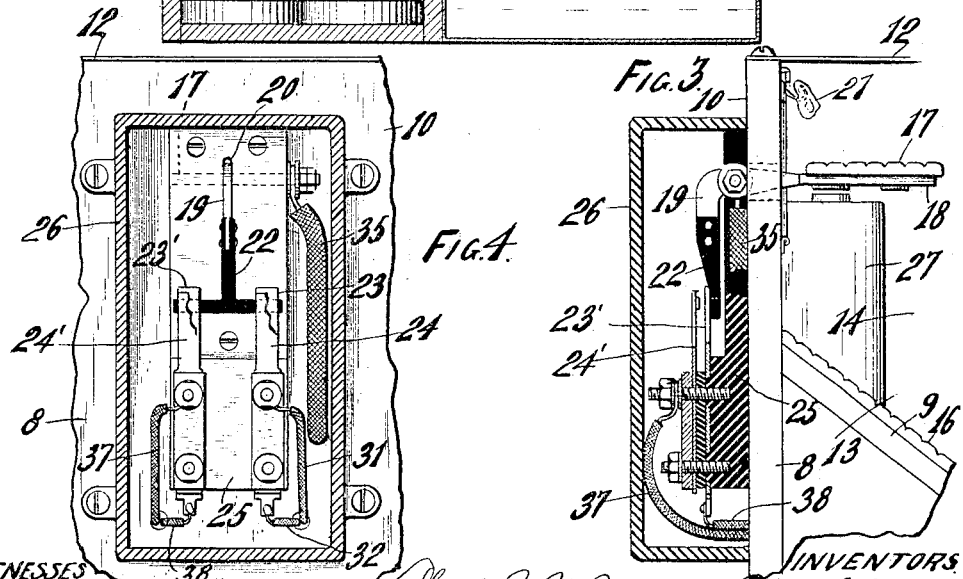
WITNESSES
INVENTORS
Charles W. McNaughton & Richard M. McDonald
By Morsell & Caldwell
ATTORNEYS C. W. McNAUGHTON & R. M. McDONALD.
ELECTRIC TRAP.
APPLICATION FILED JUNE 13, 1913.
1,117,683.
Patented Nov. 17, 1914.
2 SHEETS—SHEET 2.
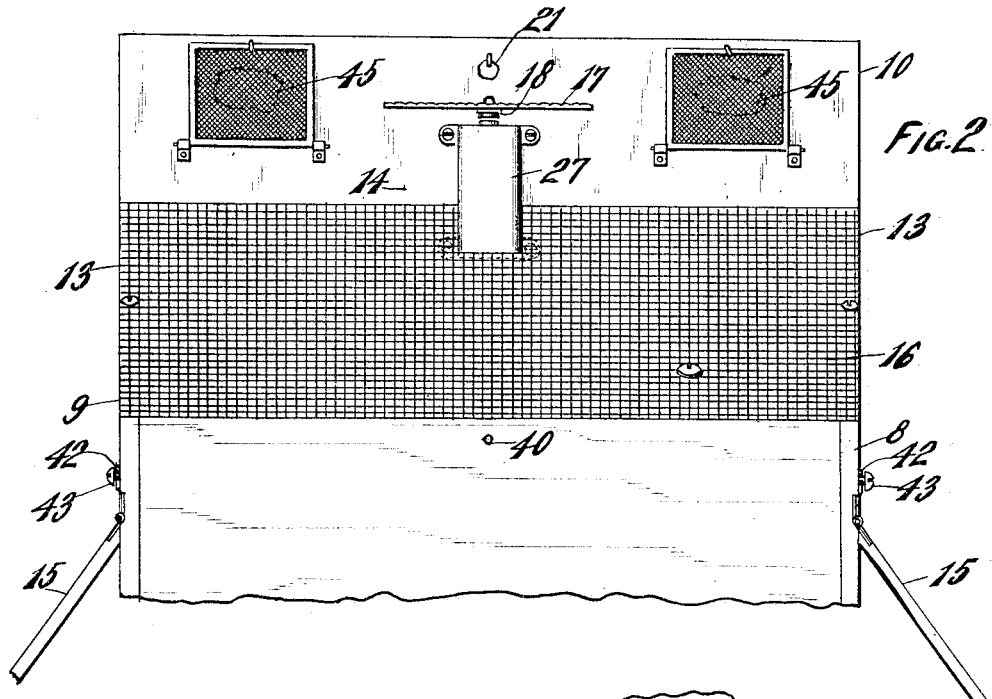
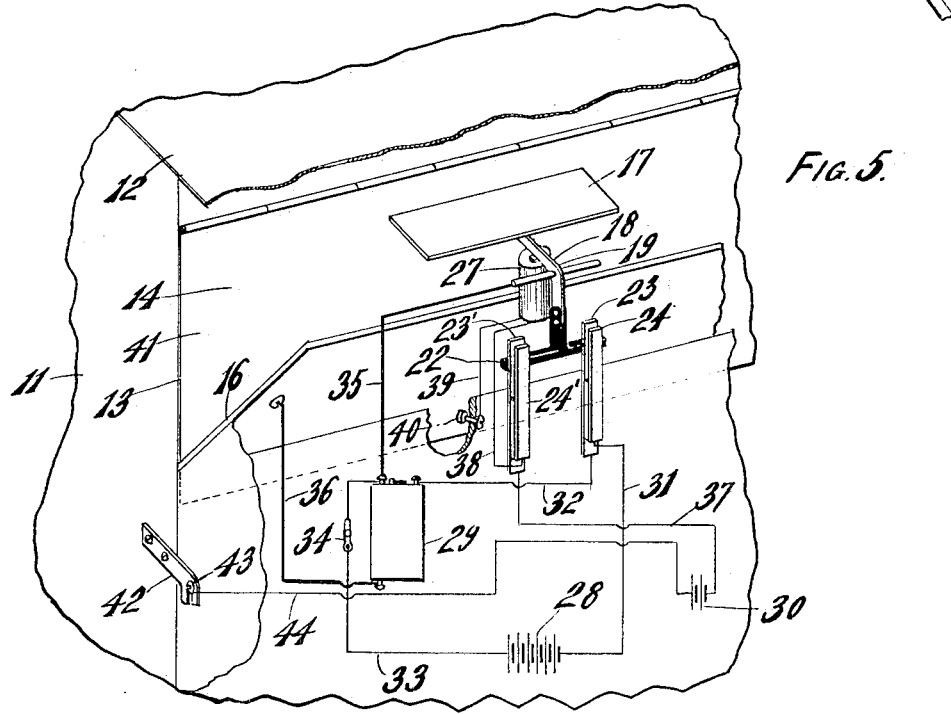
WITNESSES
INVENTORS
Charles W. McNaughton
Richard M. McDonald
By Morsell & Caldwell ATTORNEYS

UNITED STATES PATENT OFFICE.

CHARLES W. McNAUGHTON AND RICHARD M. McDONALD, OF MILWAUKEE, WISCONSIN.

ELECTRIC TRAP.

1,117,683.  Specification of Letters Patent.  Patented Nov. 17, 1914.

Application filed June 13, 1913.  Serial No. 773,463.

*To all whom it may concern:*

Be it known that we, CHARLES W. MC-NAUGHTON and RICHARD M. McDONALD, citizens of the United States, and residents of Milwaukee, in the county of Milwaukee and State of Wisconsin, have invented new and useful Improvements in Electric Traps, of which the following is a description, reference being had to the accompanying drawings, which are a part of this specification.

This invention relates to improvements in electric traps.

It is one of the objects of the present invention to provide an electric trap for electrocuting rats and other rodents which is automatic in operation and is adapted to take care of any number of rodents within its capacity.

A further object of the invention is to provide an electric trap in which the rodents subjected to the electrocuting current will be received into a tank of water and drowned in the event of their surviving the shock of the current.

A further object of the invention is to provide an electric trap with means for giving rodents a secondary current shock from a vibrating coil which will continue for a period of time after the animal has jumped from the electrodes.

A further object of the invention is to provide an electric trap of the self-contained type which is simple in construction, is strong and durable and is well adapted for the purpose desired.

With the above and other objects in view, the invention consists of the improved electric trap and its parts and combinations as set forth in the claims, and all equivalents thereof.

In the accompanying drawings in which the same reference characters indicate the same parts in all of the views: Figure 1 is a central vertical sectional view of the improved electric trap; Fig. 2 is a front view of the upper portion thereof with the tank removed; Fig. 3 is a detailed end view of the upper portion of the trap, portions thereof being in section; Fig. 4 is a rear view of the parts shown in Fig. 3 the casing being in section; and Fig. 5 is a diagrammatic view of the circuit connections and other portions of the trap shown in perspective.

Referring to the drawings the numeral 8 indicates the casing or frame of the improved trap which is of box-like form having its top portion 9 inclined downwardly and outwardly and its rear vertical wall 10 projecting upwardly above the inclined top. A tank 11 removably positioned in front of and connected to the casing is provided with a hinged top portion 12 which projects over the inclined casing top and is connected to the upper edge of the vertical wall 10. This arrangement of the case and the tank provides side entrance 13 to the electrocution chamber 14 formed between the case and the tank. Inclined boards 15 hinged to the side portions of the casing provide convenient means for the rodents easily climbing up to the said entrances. The inclined casing top is provided with a metal top portion 16 forming one of the electrodes of the electrocution device.

A movable metal platform 17 mounted on the horizontal arm 18 of a bell crank lever 19 forms the other electrode of the electrocution device. The bell crank lever is pivoted to the rear portion 10 of the vertical wall and the horizontal arm 18 projects through an opening 20 in said wall to a position above and spaced from the inclined top so that the rodent which has climbed into the electrocution chamber in reaching up for the bait 21 fastened above the platform will rest on the movable platform and bridge the gap between the two electrodes. The vertical arm of the bell crank 18 carries an insulating extension 22 of inverted T-form which is positioned to bear against the inner arms 23 and 23' of the switches 24 and 24' mounted on the insulated block 25. The block is mounted on the vertical wall just beneath the bell crank lever and the said switches and lever are covered by a casing 26 to guard the same. The horizontal arm 18 also serves as an armature of the electromagnet 27 which is mounted on the front portion of the vertical wall 10 just beneath the said horizontal arm. The magnet serves to momentarily hold said arm in its lowermost position when pressed downwardly by the rodent and provides for prolonging the duration of current flowing through the animal after the spasmodic movement resulting from the shock of the completion of the circuit has caused the animal to jump away from the movable platform electrode.

The current for electrocuting the rodents is derived from a battery 28 and a vibrating coil 29 and the current for actuating the electromagnet 27 is provided by the battery 30 all of which are located within the casing. The battery 28 is connected to the switch member 24 by a wire 31 and a wire 32 connects the co-acting switch member 23 to the vibrating coil 29. The return wire 33 connects the vibrating coil to the opposite side of the battery 28 thus completing the primary circuit when the bell crank lever is moved by the rodent to spring the switch arm 23 into contact with the switch arm 24. A hand switch 34 is included in this circuit to break the circuit when desired.

The secondary or high tension wire 35 leads from the vibrating coil to and is connected with the bell crank lever 18 and its platform electrode and the return wire 36 connects the inclined metal top or platform electrode 16 thus providing for completing the high tension current when the rodent is standing on its hind legs on the inclined platform and is resting its fore legs on the movable platform.

The battery 30 which actuates the holding electromagnet 27 is connected to the switch member 23' by a wire 37 and a wire 38 leads from the co-acting switch member 24' to the electromagnet 27. The return wire 39 extends from the said magnet to a contact member 40 which is positioned to be contacted with by the hinged swing door 41 forming part of the tank 11. The hinged door depends downwardly normally in closed position and is sufficiently light in weight to be swung inwardly to open position to permit the rodent to fall into the tank when the animal jumps or falls against the door. The swing door and the tank are formed of metal and are used to form part of the circuit being described. The tank is removably attached to the casing by projecting hook arms 42 which hook over screws 43 projecting from the casing. One of these screws is connected to the return wire 44 which extends to the opposite side of the battery 30 and completes the circuit to the electromagnet when the swing door is in closed position and the switch members 23' and 24' are in contact by the movement of the bell crank lever, the circuit being conductor 39, contact 40, hinged door 41, tank 11, arm 42, conductor 44, battery 30, conductor 37, contact 23', conductor 28, magnet 27 and conductor 39.

The vertical wall 10 is provided with screened spaces 45 for holding bait to attract the rodents to the trap.

In use the tank is partly filled with water and the parts are in the position shown in the drawings. The rodents will be attracted by the bait and will climb into the electrocution chamber and seeing or smelling the bait above the movable platform will stand up and rest on the said movable platform in reaching for the bait. In resting the swinging platform will be depressed and the bell crank lever will be moved to connect the switch arms with their co-acting members and complete the circuits to the vibrating coil and to the electromagnet. The energization of the vibrating coil will produce the secondary or high tension current which will flow through and kill the animal. As the shock will cause a spasmodic movement of the muscles of the animal the body will jump or fall against the hinged door into the tank of water and if the animal by any chance should survive the shock it will be drowned before coming to.

It will be noted that as soon as the animal receives the high tension current, it will flow through it and charge its body. Under these conditions the plate 17 being held down by the magnet 27, the current or spark from the plate 17, and the plate 16, will leap the gap between them and the animal, so that while the animal is jumping or falling away from the movable platform, it will continue to receive the high tension current. This is only possible because the contact 17 is held down by the magnet 27 during this brief period, so that the contacts 23' and 24', 23 and 24, are still in contact to complete the circuit. As soon as the swing door is opened by the impact of the rodent the circuit through the electromagnet will be broken and the bell crank lever will be released and swing to its normal position and break the circuit to the vibrating coil and the parts will be in position to repeat the operation.

From the foregoing description it will be seen that the electric trap is of simple construction and is well adapted to perform its functions automatically in an expeditious manner.

What we claim as our invention is:

1. An electric trap, comprising a pair of electrodes insulated from each other, a high tension circuit connection therefor which is normally broken, and means for automatically completing said circuit when an animal bridges the electrodes and means for maintaining said circuit for a short period of time after the animal has moved from bridging contact therewith.

2. An electric trap, comprising a fixed platform, a movable platform adjacent thereto and electrically insulated therefrom, a high tension circuit connection for the two platforms which is normally broken, and means actuated by the movement of the movable platform for automatically completing said circuit when the platforms are bridged by an animal and means for maintaining said circuit for a short period of time after the animal has moved from bridging contact with the platform.

3. An electric trap, comprising a casing having a fixed platform and a movable platform adjacent thereto, said platforms forming the electrodes of a high tension circuit, a high tension circuit connection therefor, a primary circuit connection controlling the high tension current, a switch actuated by the movable platform for controlling the primary circuit, means for holding the movable platform in its lowermost position for prolonging the duration of the high tension circuit for a period of time after the animal that has engaged the movable platform has moved away from same.

4. An electric trap, comprising a casing having a fixed platform and a movable platform positioned thereabove, said platforms forming the electrodes of a high tension circuit, a high tension circuit connection therefor, a primary circuit connection controlling the high tension current, an electromagnet for holding the movable platform in its lowermost position, a circuit connection therefor, switches actuated by the movable platform for controlling the primary circuit and the circuit to the electromagnet, and a tank having a yielding door through which the animals enter after bridging the platforms, said door serving to interrupt the electromagnet circuit when swung to open position.

5. An electric trap, comprising a casing having a fixed platform and a movable platform positioned thereabove, said platforms forming the electrodes of a high tension circuit, a high tension circuit connection therefor, a primary circuit connection controlling the high tension current, an electromagnet for holding the movable platform in its lowermost position, a circuit connection therefor, switches actuated by the movable platform for controlling the primary circuit and the circuit to the electromagnet, and a tank having a yielding door through which the animals enter after bridging the platforms, said door serving to interrupt the electromagnet circuit when swung to open position and to permit the movable platform to actuate the switch to break the high tension circuit.

6. An electric trap, comprising a pair of electrodes insulated from each other, a high tension circuit connection therefor which is normally broken, and means actuated by the animal for automatically completing said circuit, when the animal bridges the electrodes, and electrical means for locking said automatic means for a short period after the animal has ceased to bridge the electrodes.

7. An electric trap, comprising a fixed platform, a movable platform adjacent thereto and insulated therefrom, said platforms forming the electrodes of a high tension circuit, a high tension circuit connection therefor, a primary circuit connection controlling the high tension circuit, a normally open switch actuated by the movable platform, for controlling the primary circuit, and means for holding said switch in closed position, to maintain the high tension circuit through the animal after it has ceased to bridge the electrodes.

8. An electric trap, comprising a fixed platform, a movable platform adjacent thereto and insulated therefrom, said platforms forming the electrodes of a high tension circuit, a high tension circuit connection therefor, a primary circuit connection controlling the high tension circuit, a normally open switch actuated by the movable platform, for controlling the primary circuit, and electrical means for holding said switch in closed position, to maintain the high tension circuit through the animal after it has ceased to bridge the electrodes.

In testimony whereof, we affix our signatures, in presence of two witnesses.

CHARLES W. McNAUGHTON.
RICHARD M. McDONALD.

Witnesses:
KATHERINE HOLT,
C. H. KEENEY.

Copies of this patent may be obtained for five cents each, by addressing the "Commissioner of Patents, Washington, D. C."